United States Patent [19]

Zamek

[11] 4,443,100
[45] Apr. 17, 1984

[54] INDEXING APPARATUS FOR POSITIONING AND RETAINING A DISK FILM

[75] Inventor: Paul Zamek, Washington Township., Berden County, N.J.

[73] Assignee: Design Controls Corporation, Little Falls, N.J.

[21] Appl. No.: 378,243

[22] Filed: May 14, 1982

[51] Int. Cl.³ .................. G03B 27/62; G03B 27/64
[52] U.S. Cl. .................... 355/76; 354/121; 354/275; 355/64
[58] Field of Search .............. 355/75, 76, 18, 21, 355/64; 354/121, 275

[56] References Cited

U.S. PATENT DOCUMENTS

| | | | |
|---|---|---|---|
| 2,494,495 | 1/1950 | Tait et al. | 355/21 |
| 3,292,485 | 12/1966 | Mey | 355/18 |
| 4,203,664 | 5/1980 | Clifton et al. | 355/64 |
| 4,204,733 | 5/1980 | Modney et al. | 355/76 X |

*Primary Examiner*—Richard A. Wintercorn
*Attorney, Agent, or Firm*—Ralph R. Roberts

[57] ABSTRACT

Apparatus is provided for positioning and releasably holding a disk film having a multiplicity of radially disposed negatives. Three embodiments of this apparatus are disclosed and each is of a low speed, probably manually actuated, and having a support base and a driver disk member rotatably carried by the base. This driver disk moves a rotatably carried support disk having a circular support ring providing an underside support of a film disk. On and in the support base is formed an aperture providing an illuminating pathway and adjacent to this aperture is formed and provided longitudinal supports for the underside of the film disk. This film disk is releasably mounted on a pin and the support disk is provided with a drive pin that moves the film disk to be rotated with the support disk. Two pins are provided with cam lifting ends. These pins engage cutouts in the film to position the film in the desired position. A lift member is pivotally carried by the support base and has an aperture formed therein, this lift finger is biased toward the support base and has an aperture therein which is in coincidence with the aperture in the support base when the lift finger is in a gripping condition to bring the outer surface of the film to the support base and support disk to hold the film locally for illuminating exposure. The drive may be through frictional means, by a timing belt or through toothed gears either meshed or with an idler therebetween. A third disk is rotated by a gear or belt and includes cam cutouts engaged by a tongue portion of a lift member. The positioning pins that engage cutouts in the film are not necessarily used with the cam actuation of the lift finger by this third disk.

26 Claims, 11 Drawing Figures

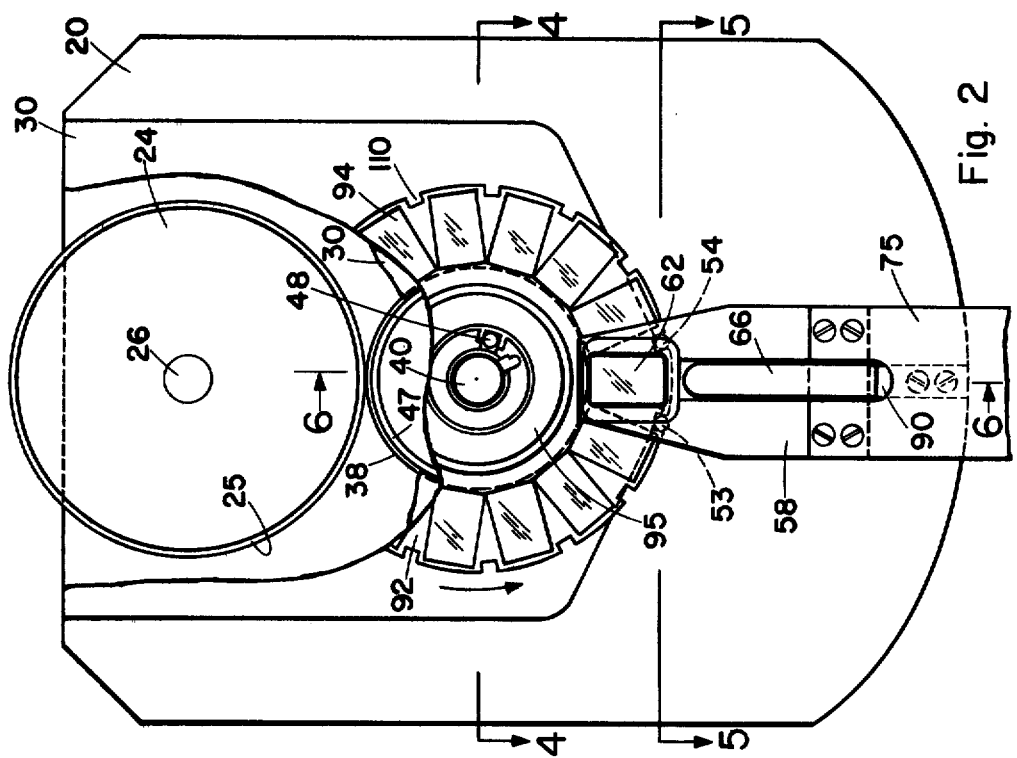
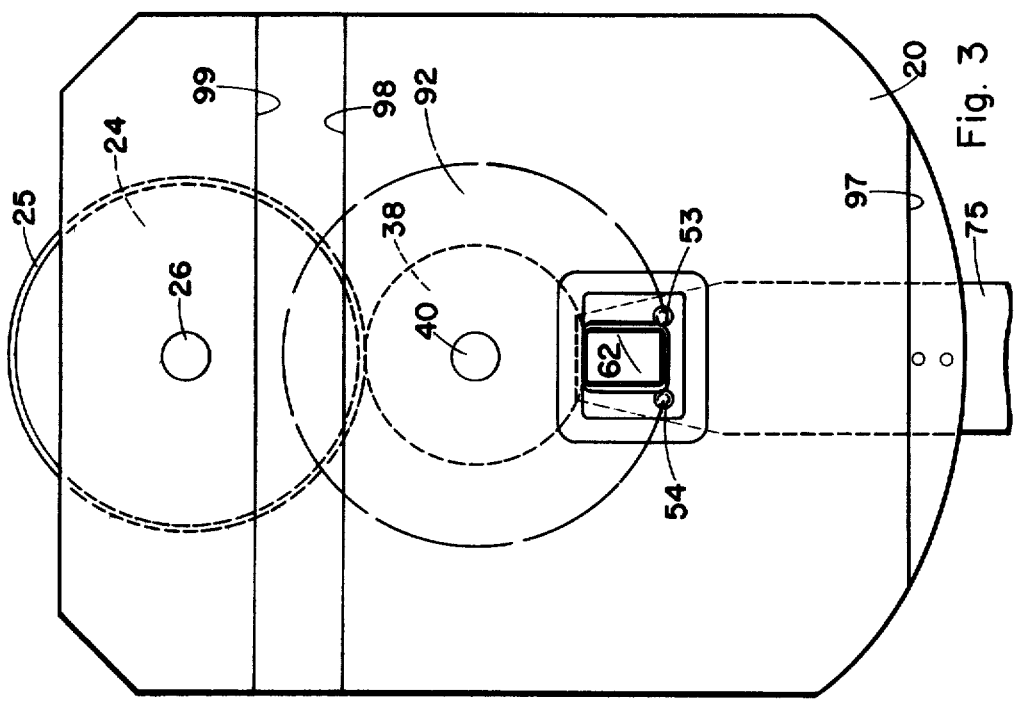

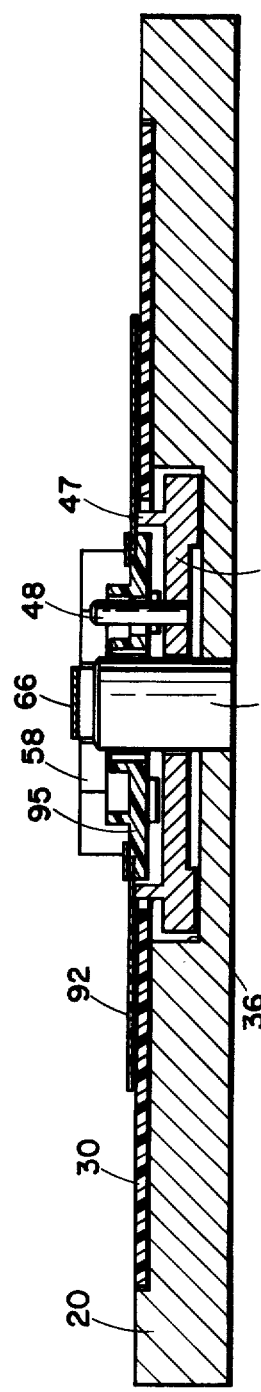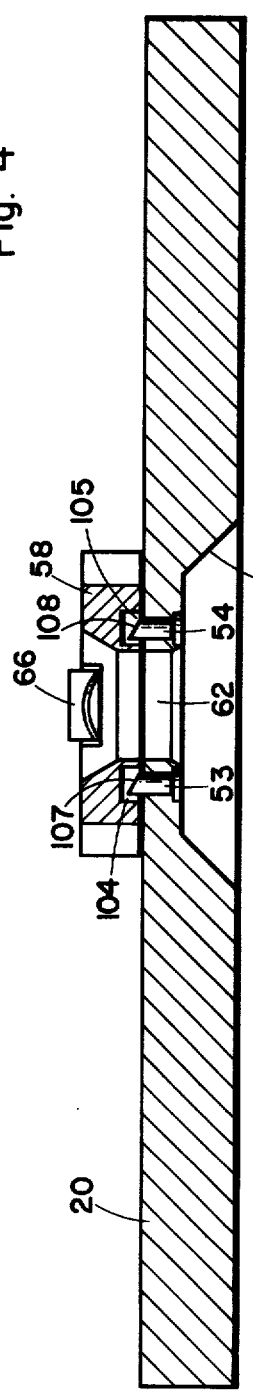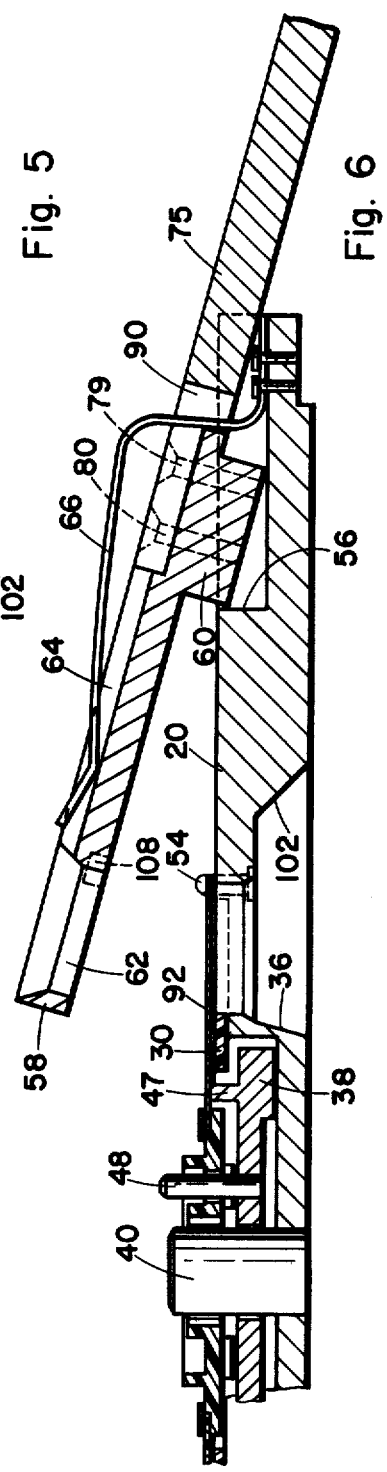

INDEXING APPARATUS FOR POSITIONING AND RETAINING A DISK FILM

BACKGROUND OF THE INVENTION

1. Field of the Invention

With reference to the classification of art as established in and by the U.S. Patent Office the present invention is believed to be found in the general class entitled, "Photocopying" (Class 355) and in the subclass entitled "including adjustable or selective masking frame" (subclass 74) and in the subclass thereunder entitled, "including vacuum, fluid or spring pressure" (subclass 76).

2. Description of the Prior Art

Rotary film holders are well known and the development of such films and exposure of prints from such films are also known. The holding apparatus used for small films such as X-ray films and sizes employed by Dentists and for microfinche are well known. The new camera and film as introduced by EASTMAN KODAK COMPANY also utilizes a rotary film disk.

Among those patents pertinent to the hereinafter more fully described apparatus are U.S. Pat. No. 2,494,495 as issued to TAIT et al on Jan. 10, 1950; U.S. Pat. No. 3,292,485 as issued to MEY on Dec. 20, 1966; U.S. Pat. No. 4,203,664 as issued to CLIFTON et al on May 20, 1980 and U.S. Pat. No. 4,204,773 as issued to MODNEY et al on May 27, 1980. TAIT et al shows a rotary film holder and a spindle that carries and positions a rotary film negative at an indicated position. There is no suggestion of a spring actuated holddown nor does the apparatus in this patent suggest a positive positioning means as in the presented application. The MEY patent shows a film printing machine for accommodating at least two different sizes of film. The two recent patents to KODAK, U.S. Pat. Nos. 4,203,664 and 4,204,733 pertain to high speed apparatus that is more-or-less of automatic operation. For example, both concepts show electronic operation with keyboard control of the apparatus. The apparatus of this invention contemplates short runs and less than high speed operation.

SUMMARY OF THE INVENTION

This invention may be summarized, at least in part, with reference to its objects. It is an object of this invention to provide, and it does provide, a disk film positioning apparatus which indexes and brings one exposed and developed negative frame in way of an illuminating path. A spring actuated lift member is moved from a retaining position in which the frame of film is held in a flat determined plane to a release position whereat the disk is rotated to a new position. This apparatus is a low speed apparatus with substantially no automation.

A further object of this invention is to provide, and it does provide, apparatus in which the film disk is carried by a support disk which is rotated to bring the frame in way of an illuminating path. The outer portion of the film disk is held by a spring biased lift member which holds the upper surface of the film disk against a flat support plane so that the frame may be copied to produce a positive print. Two fixed locating pins have cam sloped surfaces which allows the released film disk to be rotated and moved to a new position whereat the film is positioned by these same pins and again clamped for exposure in the illuminating path.

In brief, the apparatus to be hereinafter more fully described includes a base which carries a spring biased, pivotally mounted lift member having a predetermined aperture formed therein. A rotated support disk has a support ring which cooperates with side support means and an exterior surface to provide the under support for a frame of the film. Cam pins with canted upper surfaces position the film disk and enter previously formed notches or cutouts. A drive means is provided for rotating the support disk.

In addition to the above described embodiment which requires fewer parts, there is also shown the means for movement of the support disk by a timing belt and appropriate timing belt pulleys. The lift member is moved from retaining engagement with the film by a cam actuated tongue carried on a timing belt pulley. The support disk may also be connected and driven by gears. Indicia is also contemplated to show the frame being presented to the illuminating path.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of indexing apparatus for positioning and retaining a disk film as adopted for use with a disk film and showing a preferred means for constructing such apparatus. Alternate construction and drive means are also shown and described. This specific embodiment and alternate embodiments have been chosen for the purposes of illustration and description as shown in the accompanying drawings wherein:

BRIEF DESCRIPTION OF THE DRAWINGS

FIG. 2 represents a plan or top view of the apparatus of FIG. 1 with the apparatus assembled and with a disk type film in position;

FIG. 3 represents a bottom view of the apparatus of FIG. 1 with the apparatus in an assembled condition;

FIG. 4 represents a transverse sectional view in an enlarged scale and taken on the line 4—4 of FIG. 2 and looking in the direction of the arrows;

FIG. 5 represents a transverse sectional view also in an enlarged scale, this view taken on the line 5—5 of FIG. 2 and looking in the direction of the arrows;

FIG. 6 represents a longitudinal sectional view in an enlarged scale similar to FIGS. 4 and 5, this view partly fragmentary and taken on the line 6—6 of FIG. 2 and looking in the direction of the arrows;

In the following description and in the claims various details are identified by specific names for convenience. These names are intended to be generic in their application. Corresponding reference characters refer to like members throughout the several figures of the drawings.

DESCRIPTION OF APPARATUS OF FIG. 1

Figure 1:
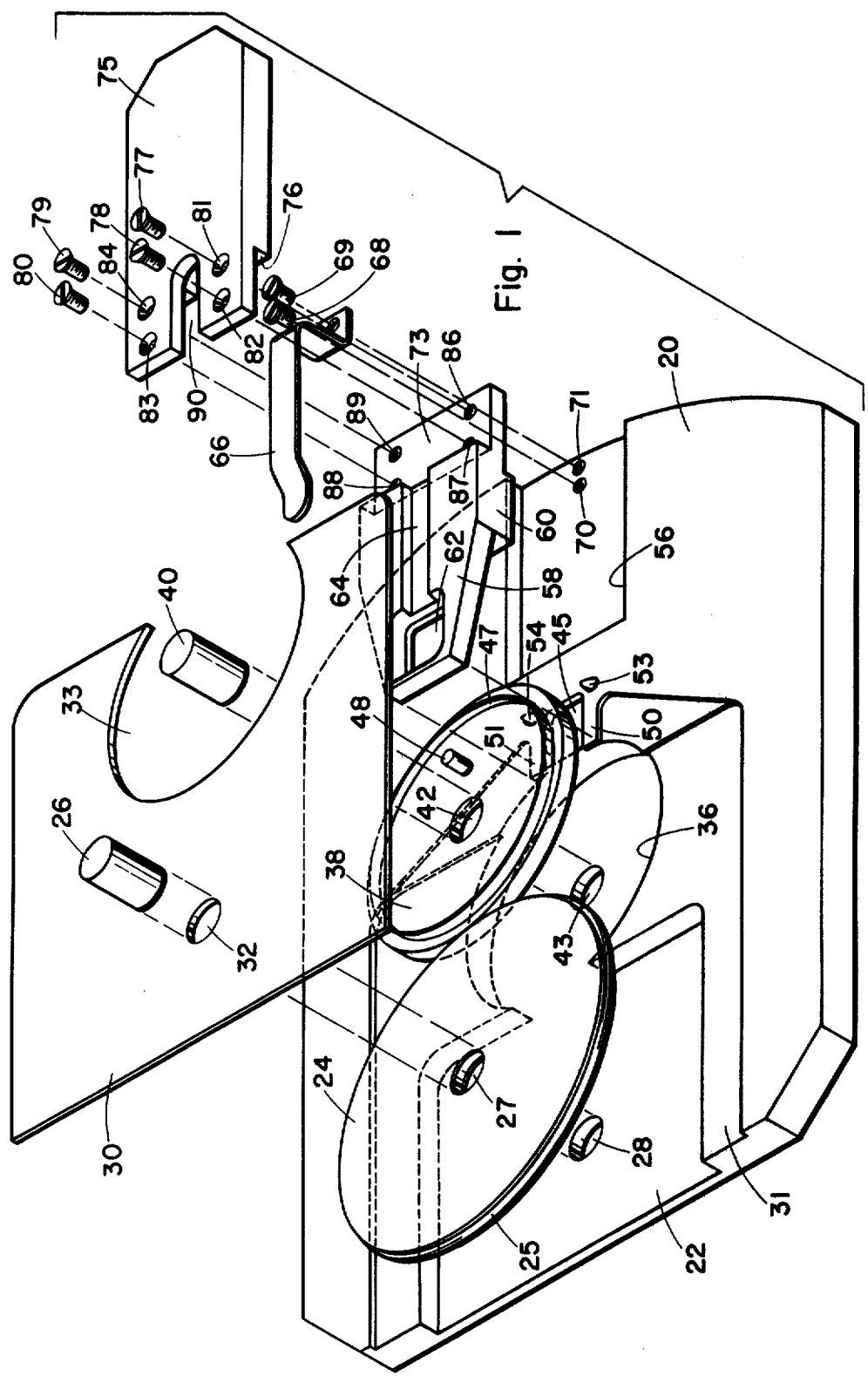
FIG. 1 represents an exploded isometric view of the apparatus used for holding the disk of film for bringing one film segment in way of the printing path, this view partly diagrammatic and showing the preferred arrangement and relationship of the parts used in this apparatus.

The exploded isometric view of FIG. 1 shows the several components utilized in the positioning and printing apparatus of this invention. A base plate 20 is contoured and shaped to provide a support of the several components that are interrelated. A recess 22, which is depicted as rectangular, is disposed to rotatably retain a drive disk 24 having a periphery 25 which provides an exterior edge friction surface. This edge portion may be of a resilient material or a knurled surface to provide a positive drive means. Central of or radially disposed therethrough at the axis of the disk 24 is a pin or post 26 which is mounted in alignment with an aperture 28 provided in base 20.

A cover member 30 is seated in a shallow recess 31 formed in the base 20 and also is provided with an aperture 32 which allows and is positioned to accept the pin 26. This cover member 30 is secured as by screws, adhesive or any conventional means. A scallop as an incomplete circular opening 33 is provided for a purpose to be defined later. A recess 36 is formed in the base 20 and extends so as to intersect recess 22 as shown. In this recess a support disk 38 is rotatably carried by a pin or post 40. Disk 38 has an aperture 42 which provides the bearing means for the rotation of the disk 38. This pin 40 is fixedly mounted in an aperture 43 radially central of the recess 36 and disposed so as to bring disk 38 and its peripheral edge 45 into driving engagement with the edge of drive disk 24. This support disk 38 also is provided with and carries support ring 47 and a drive pin 48. The support ring 47 is lesser in diameter than the diameter of the circular opening 33 provided in cover member 30. This differential of diameters enables the ring 47 to extend above the cover member 30.

Integral with and formed in the same plane as the near or upper surface of the base 20 is a stirrup portion having two tongue members 50 and 51. Adjacent thereto and radially a little greater than the tongue members 50 and 51 are pins 53 and 54. These pins are fixed in holes provided in the base 20 and the upper surfaces of those pins provide a cam means which are more fully seen in FIG. 5 and to be hereinafter more fully described.

Base 20 also is provided with a recess 56 in which is pivotally seated a lift member which provides a mask and aperture. This pivoted member 58 has a support portion 60 that is shown as integral but may be an added on and secured portion. The forward or inner portion of this lift member is contoured for aesthetic purposes and in this inner portion is an aperture 62 which is of a selected rectangular size to suit a film negative portion. A groove 64 is formed in the face of this lift member 58 and in this groove is carried a spring 66 which is secured to the base 20 by two cap screws 68 and 69 which enter and are retained in threaded holes 70 and 71 in the base 20.

Lift member 58 has a shallow recess 73 formed at its rear edge portion. In this recess is mounted a latch member 75 having mating shoulder portion 76 which enters the recess 73 in member 58. As depicted, four like screws 77, 78, 79 and 80 enter pass through holes 81, 82, 83 and 84 and are secured in threaded holes 86, 87, 88 and 89 formed in the lift member 58. The latch member 75 is secured to lift member 58 by said screws which are shown as having a tapered or substantially flat head but any other screw may be provided. This latch member has a cutout 90 which provides a passageway for the offset portion of the spring as it passes through the assembled members 58 and 75. The spring 66 is bent to provide a pressing actuation and in the description of FIG. 6 there is shown this spring bias action.

EMBODIMENT AS IN FIG. 2

FIG. 2 is partly diagrammatic in that a disk film 92 having a plurality of radially disposed negatives 94 carried by a hub 95 is depicted as partly removed. The drive disk 24 is shown mounted on post 26 and may be rotated thereon. Indicia (not shown) may be applied to the drive disk 24 and as seen in FIG. 2 a rim portion of said disk extends beyond the base 20 to provide an exposed area. With a portion of the film disk depicted as broken away and the cover member 30 thereunder the rear portion of the drive disk 24 is thus exposed. This view of FIG. 2 has the section lines 4—4; 5—5 and 6—6.

VIEW AS SEEN IN FIG. 3

Figure 11:
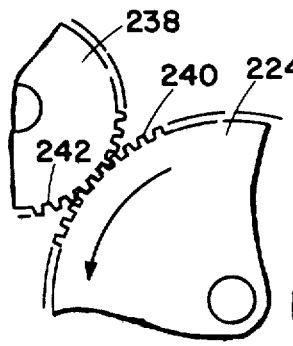
FIG. 11 represents a fragmentary and partly diagrammatic view of a gear drive rather than a timing belt as in FIGS. 7 through 10.

FIG. 3 shows the underside of the apparatus as assembled and used in FIG. 2. The bottom of the base 20 may have transverse reliefs or edge portions 97, 98 and 99 as indicated and adapted for mounting to a work surface by clamp means and the like. Shown in phantom outline is a gear form on the drive disk 24 and the support disk 38 so that a positive rotation of one to the other is achieved. This gear drive is indicated in FIG. 11 as a fragmentary alternate. This underview shows the relationship of pins 53 and 54 to the aperture 62 provided in this base 20. As depicted, the showing is more-or-less full size so that the apparatus is small enough to be hand manipulated and positioned. The sectional views 4, 5 and 6 explain the operation of the apparatus above identified.

DRIVE APPARATUS AS IN FIGS. 4, 5 and 6

The sectional views as shown in FIGS. 4, 5 and 6 represent the apparatus of FIGS. 2 and 3 but in an enlarged scale. The base 20 in FIG. 4 carries post 40 in a fixed position. The support disk 38 is rotatable around this post and moves in recess 36. As it is moved by drive disk 24, pin 48 is moved correspondingly and likewise film disk 92 is also rotated. Protruding support ring 47 engages the undersurface of the film disk 92 to provide an established support plane. The upper surface of this film disk is engaged by the spring-biased lift member 58 which presses the outer portion of the film disk into a held plane. The aperture 62 is aligned to mask out all but the contemplated through path.

The cross sectional view of FIG. 5 shows in greater detail the base 20 having a relief recess 102 in which the aperture 62 is formed. The undersurface of lift member 58 is provided with shallow recesses 104 and 105 which accommodates the projecting portions of pins 53 and 54. The upward extending ends of these pins are formed with sloped surfaces 107 and 108 which are disposed to allow the film disk to be rotated in one direction but the extending portions enter cutouts 110 (FIG. 2) in the film disk to prevent any back motion and to insure precise placement of the film disk in relation to these pins 53 and 54.

The partly fragmentary view of FIG. 6 shows the lift member 58 in a rotated and raised position in which the apertured end of lift member 58 is lifted against the spring bias 66. Pin 40 positions the film disk 92 and rotation is imparted by the pin 48. As seen in this view, spring 66 is secured at its right end by cap screws 68 and 69. The spring 66 is bent upwardly immediately to its left secured end and passes through the cutout 90 formed in the latch member 75 and then is bent to enter and be retained in groove 64. The forward or free left end of spring 66 is rounded and is canted forwardly and upwardly so that only an obtuse angle portion of the spring near the tip end engages the lift member 58. This spring 66 is made with and provides the necessary bias to cause the disk film to be held in a predetermined plane.

USE AND OPERATION OF THE APPARATUS OF FIGS. 1 THROUGH 6

The apparatus of FIGS. 1 through 6 anticipates holding a disk film 92 which is revolved by a drive disk 24 that moves a support disk 38 in a timed response. The film disk 92 is formed with a drive aperture in which pin 48 enters and engages this film disk to rotate this disk as support disk 38 is moved. This drive arrangement is seen in FIG. 2. The cam locating pins 53 and 54 enter cutouts 110 in the film as and when the film disk 92 is rotated. Movement of the film disk is only possible when and as the lift member 58 is moved to the position of FIG. 6. These pins 53 and 54 engage the cutouts or notches 110 as and when the film disk is at a determined position. A slight back or reverse movement of the drive disk 24 establishes seating of the film on the pins.

In the gripped condition of FIGS. 2 and 4 the film disk 92 has the radially disposed and developd negative 94 brought in way of and aligned with the aperture 62 in both lift member 58 and in base 20. The portion of the apparatus exterior of this aperture provides mask means. As the lift member 58 is brought to the position of FIG. 6 the film 92 may be rotated counterclockwise as shown by the arrow in FIG. 2. The sloped cam surfaces 107 and 108 on the pins 53 and 54 cause the rotated film to be lifted as the film disk is moved to a new position. As noted above, the movement of the disk film is only possible when the lift member 58 is moved from the film disk.

It is to be noted that support ring 47 on support disk 38 engages the inner and under surface of the film disk at the negative portion 94. The outer portion 95 of the film is supported by that portion of base plate 20 between pins 53 and 54. Tongue members 50 and 51 provide the side supports for the undersurface of the film. The lift member 58 and that portion around aperture 62 of member 58 provides the gripping of the disk film on and at its outer surface.

The pivot action provided by the assembly of lift member 58 and latch member 75 establishes the positive placement of the aperture 62 on the disk film and in a precise alignment with the aperture in the base 20. The support portion 60 of the lift member 58 is sized to engage the vertical surface at the interior of recess 56. The rear edge of member 58 is engaged by the vertical portion of spring 66. The spring 66 seats in the groove 64 to prevent and provide guiding of this lift and latch member assembly. The forward edge of support portion 60 is shown a short distance from the recess 56 for the purpose of illustration but this support and spring are so sized and positioned that a precise pivoting actuation and retention is achieved.

ALTERNATE EMBODIMENT OF FIGS. 7, 8, 9 and 10

Figure 7:
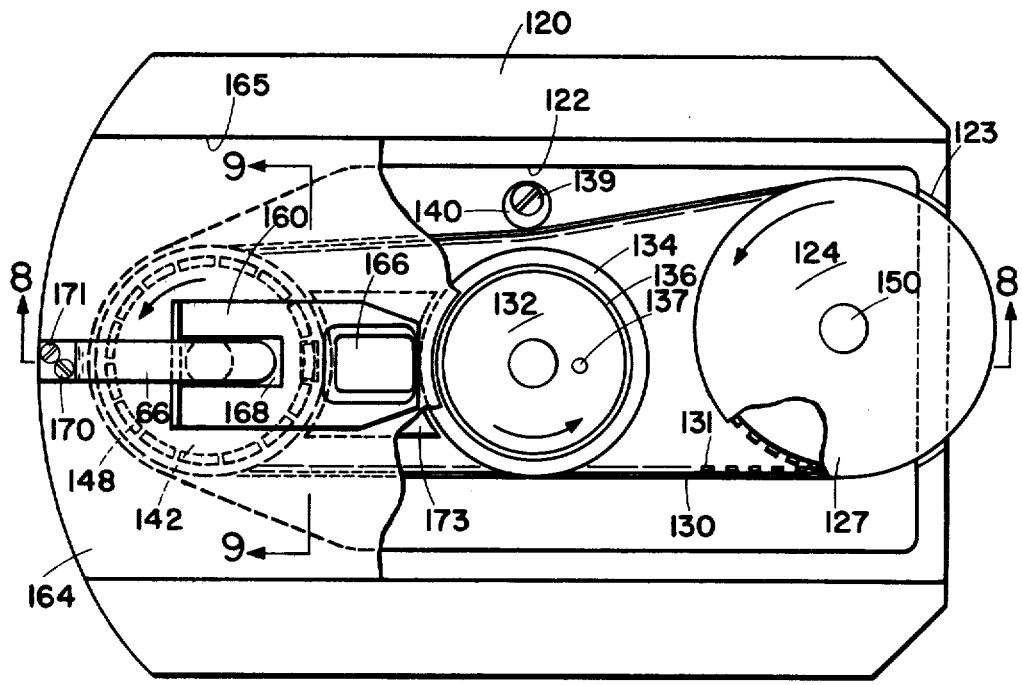
FIG. 7 represents a plan view similar to the apparatus shown in FIG. 2 but with the drive rotation by a small timing belt and toothed gears rather than a friction drive.

In FIGS. 7 through 10 the indexing apparatus of FIG. 1 through 6 is altered to provide a cam-actuated lift member that is automatically lifted when a desired rotation of the film disk is made. Rather than the finger manipulated latch member 75 of FIG. 1 this alternate embodiment utilizes a timing belt and toothed pulleys. As shown in FIG. 7, a base plate 120 includes a recess 122 in which is formed a passageway or opening 123 in the wall in or at the right or bottom end of said base plate. A drive pulley 124 has teeth 125 provided in and on its midportion. Conventionally, this drive pulley 124 has a top and bottom plate member 127 and 128 to provide the guide and retention means for a belt 130 used therewith. This timing belt is an endless belt and includes teeth 131 formed so as to extend inwardly.

This timing belt 130 drives a support pulley 132 having a bottom plate disk 133 and a special top or cover disk 134 including a support ring 136 formed or integral with this cover disk. This ring provides a support for the underside of the disk film in the manner of support disk 38 in FIG. 1. A cover disk is shown as providing a conventional guide means for the belt but other means can be provided such as a central rib portion on the belt. The support ring 136 need not be a ring but may be formed as a filled in central portion if desired. A drive pin 137 is carried by this cover disk and corresponds in use to the drive pin 48 above described. To the right of support pulley 132 is a conventional belt tightener device which includes a cap screw 139 and an eccentric bushing 140 that is adjusted by rotation to engage the back or smooth outer surface of the belt and when adjusted provides the desired degree of taughtness.

A third cam timing belt pulley generally identified as 142 is also carried in recess 122. This third pulley includes a toothed midportion 144 and a lower disk 145. A top disk 146 of metal such as aluminium includes a multiplicity of arcuate cam pockets 148 of a determined size and shape. The drive pulley 124 is carried and is rotatable on a pin or post 150; the support pulley 132 is carried by and is rotatable about a pin or post 152 and the third or timing belt pulley 142 is carried by a pin or post 154.

As the top disk 146 is rotated with the associated pulley 142 assembly, a pivoted lift member 160 is camed sufficiently upwardly to permit the film disk 92 (not shown) to be rotated. This lift member 160 is pivotally retained by a hinge pin 162 seen in FIGS. 7 and 8. This hinge pin is retained by and with a cover member 164 secured in a formed recess 165 in base plate 120. This pivoted lift member 160 has a formed aperture 166 much like the aperture 62 in lift member 58 of FIG. 1. This pivoted lift member 160 has a groove 168 in which a leaf spring 66 is retained. The end of the spring 66 is secured by cap screws 170 and 171 which are mounted in threaded holes formed in the base plate.

Figure 8:
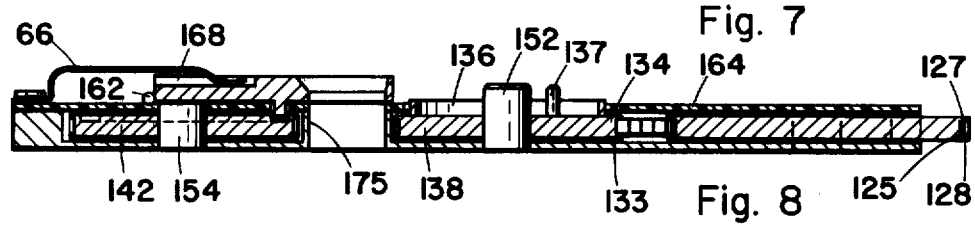
FIG. 8 represents a sectional view taken longitudinally of the apparatus of FIG. 7, this view taken on the line 8—8 thereof and looking in the direction of the arrows.

As seen in FIG. 8, the central portion of the base plate 120 is formed with a support portion 173 provided between the grooved extents of that portion of the timing belt 130 between pulleys 132 and 142. An aperture 175 is formed in and through this support portion 173. This aperture 175 is in coincidence with aperture 166 in the lift member 160. A cam tongue 177 enters and seats in one of the shallow arcuate cam pockets 148. This tongue 177 has its right edge (FIG. 9) formed with a ramp or sloped end 178 so as to lift the member 160 above a gripping condition of the film disk 92. The spring 66 is made to just press the radially disposed negative portions of the film 92 into a fixed and held plane.

Figure 10:
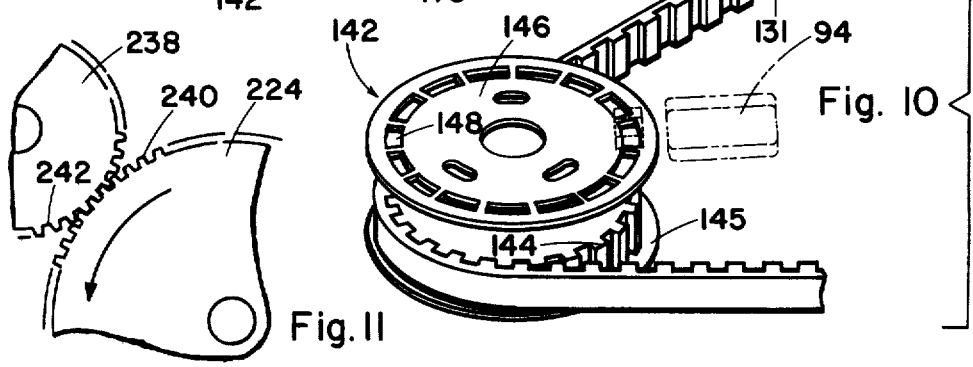
FIG. 10 represents an isometric, exploded, and partly diagrammatic view of the timing belt drive showing a pulley and belt, with this pulley having indexing apertures formed therein.

As seen in FIG. 10, the timing belt pulley identified as 142 is shown as being made with three metal portions. That is to say, central tooth mid-portion 144 and upper and lower disk portions 146 and 145. Timing belt pulleys are well known and the method of manufacture is a matter of preference. The arcuate cam pockets 148 may be formed in the separate disk or a lost wax molding process may be used for this pulley. The teeth in midportion 144 and the pockets 148 are selected to correspond with the film disk being utilized. Pin 137 as disk 132 is rotated also moves the disk film accordingly. Pockets 148 and cam tongue 177 provides the desired precise positioning of disk film negative. If and when desired cam pins similar to pins 53 and 54 (FIG. 5) may be provided and utilized.

USE AND OPERATION OF APPARATUS OF FIGS. 7 THROUGH 10

The apparatus depicted in the FIGS. 7 through 10 anticipates the mounting of a disk film on the support pulley 132 and with the ring 136 provides a desired inner support for the inner portion of film around the negative portion. The support portion 173 of the base plate 120 provides the longitudinal under support of the film. The extreme outer portion of the film is supported on its underside by the contoured support portion 173. The outer portion of the film disk is gripped and retained in a flat state by the pivoted lift member 160 as it is urged into position by spring 66.

The spacing and size of the toothed pulleys 124, 132 and 142 is a matter of selection and the illuminating path through apertures 166 and 175 and the provided contour is merely a matter of selection to accept the disk film and the amount of enlargement to be made. Cover 164 is shown in FIG. 7 as partly broken away to disclose the detail of the drive of pulleys 124 and 132 but it is to be noted that a circular opening 184 is provided in cover 164 so that the support pulley ring 136 extends above this cover. The cover portion, not illustrated in FIG. 7, has said circular opening 184 which is slightly larger than the outer diameter of ring 136.

Figure 9:
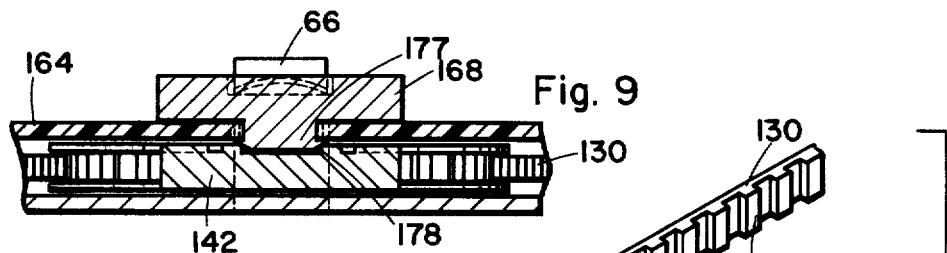
FIG. 9 is a fragmentary transverse view of the apparatus of FIG. 7, this view in an enlarged scale and taken on the line 9—9 thereof and looking in the direction of the arrows.

It is to be noted that FIGS. 9 and 10 are in an enlarged scale and are fragmentary and illustrate the relationship and interaction of parts. It is to be further noted that positioning of the pulleys 124, 132 and 142 is a matter of selection and available room depending on the film size to be accommodated. The lift member 160 is depicted as pivotally retained by a hinge pin 162 and groove 168 and cooperating spring 66 but this does not preclude flexible members such as plastic and instead of spring 66 a weight means or a rubber bias may be used for urging lift member 160 toward the holding position of FIG. 8. This view is partly diagrammatic in that the undersurface of member 160 is adapted to engage and hold the exterior portion of the disk film (not shown) as it is retained in an illuminating path. The slope 178 on tongue portion 177 is shown as formed on the right end of this tongue and slope 178, when and if adapted for clockwise rotation, is formed exactly opposite. It is to be noted that the tongue 177 is shallow in extent and that it enters and is actuated by the arcuate pockets 148. The depth of these pockets and their shape is a matter of design to accommodate the thickness of film and the amount of upward lift desired for the lift member 160. The number, shape and extent of the cam pockets 148 are dictated by the disk film arrangement.

ALTERNATE EMBODIMENT AS SEEN IN FIG. 11

Referring next and finally to an alternate embodiment as depicted in FIG. 11, it is suggested that instead of a frictional drive as in FIGS. 1–6 the drive force may be positively induced by gear teeth formed on the drive and support members. In FIG. 11 these teeth are depicted with drive and support gear members 224 and 238. The gear teeth on the periphery are identified as 240 and 242. FIG. 11 is illustrative of gear teeth and the drive and driven disks have their peripheral portions with gear teeth.

In driving relationship the gear teeth mesh and drive disk member 224 moves in counter rotation to the support disk member. If desired, the gear teeth 240 and 242 may not engage or mesh with each other but with an idler gear therebetween. Idler gears may also be employed if a pivoted latching and cam-actuated arrangement for lift member 160 is desired. It is also contemplated that lever means with a cam actuation may be employed to lift pivoted member 160 upwardly in a timed response.

What is required in each embodiment is a positive positioning means for the disk film; a positive holding of one negative portion in a gripped condition and plane in way of an illuminating means; means for releasing the disk film so that one negative portion may be moved to a selected next position and means for removal of a disk film and loading the apparatus for printing of the negative in another disk film.

Indicia is contemplated as being applied to each of the drive members so as to indicate to the operator the position of the disk film in the apparatus.

It is to be noted that the disk film is removably positioned on the pin or post carrying the support disk member. This pin or post extends upwardly above the cover to provide a mounting means that is engaged by the aperture in the disk film. The drive pin 48 is positioned to engage a drive aperture or hole in the disk film but other means may be provided including key means. A positive drive for precise positioning is desired in the use of a third disk as shown in FIGS. 7–10. The drive disk is shown as greater in diameter than the diameter of the support disk member. This differential enables the support member to be rotated for a full circular extent without a like angular motion of the drive disk. When a timing belt or gear teeth is used, the manipulated or rotated drive disk may be smaller than shown but it is anticipated that the diameter of the drive disk is as great or greater than the support disk member.

It is anticipated that the pins or posts providing the axis for rotation of the shown components be fixed in the support base but this does not preclude the carrying of these posts in bearings or providing bearing means on the disk members. The cover members are of plastic since this material is easily and inexpensively fabricated, but metal may be used if desired. Pins 53 and 54 are shown as mounted in holes formed in the support base but other cam configurations may be provided and the cam means may be made as rectangular projections and as a molded bridge mounted in a formed recess. The cam means provided thereon is contemplated to provide a desired lifting action and also precise positioning corresponding to the disk film configuration.

Bias provided by the leaf spring 66 is easily provided and calibration is achieved for the particular desired gripping force. Rather than a leaf spring of metal, this bias may be provided by a coil spring; a rubber-like member or weight. The lift member is selectively lifted by mechanical or manipulative means and the aperture formed therein is a matter of selection to correspond to the disk film to be enlarged. This lift member and the aperture in the support base may be made as a replaceable portion or member to change the size of the aperture and the illuminating pathway. The timing belt drive of FIGS. 7 through 10 show a three disk arrangement but it is to be noted that a timing belt 130 may be used with only members 124 and 132 and with the belt tightener device of screw 139 and eccentric bushing 140 moved to another intermediate position. Instead of a timing belt a bead chain or the like is also contemplated. The cam actuation provided by pockets 148 in member 142 may instead be protruding lobes or portions if desired. The cam pockets 148 may have sloped ends and the slope 178 on tongue 177 may be reduced to allow the cam actuation to be provided by such an alternate equivalent. Also contemplated is a cam slope formed on both ends of the tongue 177 or with sloped ends in the pockets 148. The intended direction of rotation establishes the placing of the cam slope but if the cam actuation is to be produced with rotation in either direction slope ends are required on both ends of either the tongue 178 or the pockets 148 or both.

When and where film positioning is established in total or on part by a cam disk as a third disk the illuminating and through path needed usually has a drive of this third disk by a belt, chain or idler gear. This does not bring any component in way of this path but this does not preclude a spoked wheel which may provide a clear pathway at particular positions of the disk film. Cam means for positioning the disk film as provided by the pins 53 and 54 may be utilized when and where desired and particularly with a third disk. Idler gears used in a gear train are well known and hence are not illustrated in connection with FIG. 11. Idler gears are shown in U.S. Pat. No. 4,002,280 as issued Jan. 11, 1977.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and do not necessarily apply to the position in which the indexing apparatus for positioning and retaining a disk film may be constructed or used.

While particular embodiments of the film positioning apparatus have been shown and described it is to be understood the invention is not limited thereto and protection is sought to the broadest extent the prior art allows.

What is claimed is:

1. Apparatus for positioning and releasably holding a disk film characterized as having a multiplicity of developed negatives arranged in a radial array, this apparatus adapted to receive one negative portion at a time and to releasably grip said film negative above and below so as to provide in a gripped condition a determined flat plane in which the negative is held, this apparatus disposed to accept one film disk at a time and to fixedly position said disk on a rotatable support member, said apparatus including:
   (a) a support base;
   (b) a drive disk-like member rotatably carried by said support base;
   (c) a support disk member rotatably carried by said support base, said member having an outwardly projecting circular and radially positioned portion adapted to engage and support an underside portion of the disk film;
   (d) drive means for moving the support disk member by and in relation to the movement of the drive disk member;
   (e) means provided on the support base for engaging the underside of the disk film along the lateral extents thereof and an aperture formed in this support means of the base, and adjacent this aperture and outward of the aperture providing a support of the outer portion of the disk film so as to support the developed negative when moved thereagainst, this underside support establishing a determined support plane;
   (f) means provided on the drive disk member to positively rotate said support disk member as the drive disk member is rotated;
   (g) a lift member pivotally retained by and carried by the support base, said lift member having an aperture therethrough and with the aperture formed in the support base and providing means for an illuminating path through the positioned and held negative portion of the disk film, said lift member urged towards the support base and into a gripping condition by bias means, said bias means a leaf spring secured at one end to said support base, the lift member also including a support portion extending toward the support base and carried in and by guide means provided with and by said support base and with the leaf spring providing guide means and limits of motion for the lift member which is selectively movable from said gripping condition, said lift member having its underside adapted to provide a gripping surface for the outer surface of the disk film as and when said disk film is gripped, and
   (h) means carried by the support base and disposed to engage the film as it is rotated so as to precisely position said film when in an engaged condition and to release said film from said precise and gripped condition during rotation.

2. Apparatus as in claim 1 in which the drive means includes frictional means peripherially disposed and provided on the periphery of the drive disk-like member and/or the support disk member.

3. Apparatus as in claim 1 in which the drive-like disk member includes a friction periphery adapted to engage a periphery of the support disk member and drive said support disk member in a counterflow direction.

4. Apparatus as in claim 1 in which the drive disk-like member is rotatable around a pin or post carried by the support base.

5. Apparatus as in claim 4 in which the support disk member is also rotatably mounted on a pin or post carried by said support member and with said pin or post extending sufficiently to provide a central support axis for positioning the rotating disk film.

6. Apparatus as in claim 1 in which the outwardly projecting circular portion on the support disk member is a ring-like portion with a substantially continuous support plane surface.

7. Apparatus as in claim 6 in which the ring-like portion is integral with a top portion of said disk and the drive means for rotating the disk film is a pin carried by and adapted to enter an existing aperture in the film as it is positioned on said pin or post.

8. Apparatus as in claim 1 in which the means for positioning the film includes two fixed pins spaced a given distance apart and having protruding sloped ends forming cam portions extending above the support base and providing an upward lift means of and for the disk film as it is rotated toward the sloped ends and with the two pins providing positive positioning when and as these pins engage cutouts in the disk film.

9. Apparatus as in claim 1 in which the outwardly projecting circular portion of the support disk member is integral with and formed as a portion of said support disk member.

10. Apparatus as in claim 1 in which the support portion is mounted in a groove formed in the base support and the leaf spring is mounted so that a free end moves and is retained in a groove formed in the lift member.

11. Apparatus as in claim 1 in which there is provided a latch member which is assembled to said lift member, and there is provided a cutout through which a portion of the leaf spring extend to provide a rear limit of movement for said lift member.

12. Apparatus as in claim 1 in which the lift member is formed with a shallow recess at the outer end thereof and away from the aperture, and into said recess is mounted a latch member formed with a shallow portion and assembly of the lift member to the latch member is provided by screw means.

13. Apparatus as in claim 12 in which the support base is formed with a recess into which the drive disk-like member and the support disk member are rotatably mounted on pins or posts secured to the support base and with this recess substantially closed by a cover having an arcuate cutout for the extension therethrough of the outwardly extending circular portion of the support disk and with an end portion of the drive disk-like member exposed for manipulation.

14. Apparatus as in claim 1 in which the drive means for the disk film includes forming the drive disk-like member and the support disk member with gear teeth of like pitch and by and with rotating movement of said drive disk-like member the gear teeth produces a corresponding movement of said support disk member.

15. Apparatus as in claim 14 in which the gear teeth on the drive disk-like member and the gear teeth on the support disk member are in mesh.

16. Apparatus as in claim 14 in which the gear teeth on said drive disk-like member and the gear teeth on the support disk member are in engagement with and movement therebetween is provided by a timing belt engaging said gear teeth.

17. Apparatus as in claim 16 in which the timing belt also drives a third disk-like member having gear teeth thereon, said third disk-like member having cam means adapted to be actuated as this third disk-like member is rotated to cause the lift member to be raised from film gripping condition and lowered with rotation, this raise and lowering action being when the third disk-like member is rotated in timed relationship with the positioning of the film disk.

18. Apparatus as in claim 17 in which the third disk-like member is rotatably carried on a pin or post secured to the support base.

19. Apparatus as in claim 18 in which the lift member is pivotally secured at one end by a hinge pin.

20. Apparatus as in claim 17 in which the cam means provided by the third disk-like member is a tongue portion extending from the lift member and adjacent the aperture, said tongue portion sized and shaped to enter one of a sequence of cam cutouts formed in the outer portion of the third disk-like member, this cam actuation provided by a sloped surface provided on one of the mating members and with a compatible means formed on the other member portion, the seating of said tongue in a cam cutout precisely positioning the disk film and the film negative portion therein.

21. Apparatus as in claim 20 in which the sloped surface is formed on the extending tongue.

22. Apparatus as in claim 14 in which there is provided a third disk-like member having gear teeth thereon, this third disk-like member having cam means adapted to be actuated as this third disk-like member is rotated and as it is rotated to cause the lift member to be raised from a film gripping condition and with further rotation to be lowered to a film gripping condition, this raise and lowering being in timed relationship with the positioning of the film disk.

23. Apparatus as in claim 22 in which the third disk-like member is rotatably carried on a pin or post secured to the support base.

24. Apparatus as in claim 23 in which the cam means provided by the third disk-like member is a tongue portion extending from the lift member and adjacent the aperture, said tongue portion sized and shaped to enter one of a sequence of cam cutouts formed in the outer portion of the third disk-like member, this cam actuation provided by a sloped surface provided on one of the mating members and with a compatible means formed on the other member portion, the seating of said tongue in a cam cutout precisely positioning the disk film and the film negative portion therein.

25. Apparatus as in claim 24 in which the sloped surface is formed on the extending tongue.

26. Apparatus as in claim 25 in which the third disk-like member is driven by gears which are in mesh with or without additional idler gears.

* * * * *